United States Patent
Eastman

(10) Patent No.: US 10,260,884 B2
(45) Date of Patent: Apr. 16, 2019

(54) APPARATUS AND METHOD FOR USING MAP DATA IN A CALIBRATION PROCESS

(71) Applicant: Under Armour, Inc., Baltimore, MD (US)

(72) Inventor: Kyler Eastman, Austin, TX (US)

(73) Assignee: Under Armour, Inc., Baltimore, MD (US)

( * ) Notice: Subject to any disclaimer, the term of this patent is extended or adjusted under 35 U.S.C. 154(b) by 0 days.

(21) Appl. No.: 15/146,054

(22) Filed: May 4, 2016

(65) Prior Publication Data
US 2017/0322031 A1 Nov. 9, 2017

(51) Int. Cl.
| | |
|---|---|
| *G01C 21/16* | (2006.01) |
| *G01C 25/00* | (2006.01) |
| *G01C 22/00* | (2006.01) |
| *G01S 19/19* | (2010.01) |

(52) U.S. Cl.
CPC ........ *G01C 21/165* (2013.01); *G01C 25/005* (2013.01); *G01C 22/006* (2013.01); *G01S 19/19* (2013.01)

(58) Field of Classification Search
None
See application file for complete search history.

(56) References Cited

U.S. PATENT DOCUMENTS

| | | | |
|---|---|---|---|
| 7,603,255 B2 | 10/2009 | Case, Jr. et al. | |
| 8,086,421 B2 | 12/2011 | Case, Jr. et al. | |
| 8,512,211 B2 | 8/2013 | Rottler et al. | |
| 8,517,896 B2 | 8/2013 | Robinette | |
| 2002/0173908 A1* | 11/2002 | Sakamoto | G01C 21/3688 701/431 |
| 2004/0083528 A1* | 5/2004 | Stewart | A41D 13/02 2/69 |
| 2006/0184320 A1* | 8/2006 | Hong | G01C 21/34 701/433 |
| 2006/0206264 A1* | 9/2006 | Rasmussen | |
| 2010/0250179 A1* | 9/2010 | Mariano | A63K 3/00 702/96 |
| 2011/0119027 A1* | 5/2011 | Zhu | G01C 22/006 702/160 |
| 2014/0163871 A1* | 6/2014 | Shingyoji | G01C 21/165 701/490 |

* cited by examiner

*Primary Examiner* — Lail A Kleinman
(74) *Attorney, Agent, or Firm* — Maginot, Moore & Beck LLP

(57) ABSTRACT

Apparatus and method for using map data of a known route to calibrate an accelerometer to one or more physiological parameters of a user. In one embodiment, the calibration comprises determining a current position of a user; consulting map data to identify a route having a starting and/or ending position within a predefined proximity to the current position, the route having a known length; collecting data with the accelerometer as the user traverses the route; calculating a calibration factor based on one or more physiological qualities specific to the user; and causing the calibration factor to be stored and applied to subsequently collected data from the accelerometer.

14 Claims, 15 Drawing Sheets

APPARATUS AND METHOD FOR USING MAP DATA IN A CALIBRATION PROCESS

FIELD

This disclosure relates to the field of activity monitoring systems and in particular to calibrating an activity monitoring system.

BACKGROUND

Active individuals, such as walkers, runners, and other athletes commonly use electronic devices to track both fitness data and route data. For example, a runner may utilize a health monitoring or measuring device to determine the distance that was traversed during a workout. One type of measuring device comprises an activity or distance measuring device which includes an accelerometer for determining the distance traversed by the runner. The accelerometer generates accelerometer data based on the detected movements associated with each stride taken by the runner. The accelerometer data is then processed to determine the distance traversed.

In some instances, the distance measuring device is further calibrated to ensure that the distance measuring device accurately determines the distance traversed by the user. One approach for calibrating the distance measuring device includes comparing a distance traversed as measured by the accelerometer to a distance traversed as measured using the global positioning system ("GPS"). The calibration process includes, processing the accelerometer data so that the distance traversed as measured by the accelerometer is equal to the distance traversed as measured by the GPS.

Global Positioning System calibration is typically useful and accurate; however, in some areas GPS signals are impacted by the topography of the landscape and cannot be reliably received by the typical consumer-level device. For example, in areas known as "street canyons" or "urban canyons" tall buildings can almost completely block the GPS signals from reaching a GPS receiver of the typical distance measuring device. Additionally, GPS data does not take into consideration altitude changes and/or other physiological parameters of the user which may effect stride length. As a result, in such an environment, GPS distance tracking is not the most accurate means for calibrating a distance measuring device. Accordingly, improvements in distance measuring devices and the processes for calibrating a distance measuring device are desirable.

SUMMARY

According to an exemplary embodiment of the disclosure, a method of calibrating data collected by a monitoring device to one or more physiological parameters of a user, said method includes determining a current location of the user; providing at least one calibration route to the user via a display, the calibration route having a known length; receiving step data from the monitoring device as the user traverses the calibration route; and calculating a calibration parameter representative of at least one physiological parameter of the user based at least in part on the known length and the received step data.

According to another exemplary embodiment of the disclosure, a non-transient computer readable medium containing computer executable instructions which are configured to, when executed by a processor: determine a current position of a user; consult map data to identify a route having a starting and/or ending position within a predefined proximity to the current position of the user, the route having a known length; receive data collected by an accelerometer as the user traverses the route; and calculate a calibration factor representative of at least one physiological parameter of the user based at least in part on the known length and the received step data.

According to yet another exemplary embodiment of the disclosure, a personal electronic device is configured to enable calibration of data relating to a distance traveled by a user. The device includes a transceiver apparatus configured to receive step data from an device comprising at least an accelerometer; at least one storage apparatus; and a processor configured to execute at least one computer application thereon, the computer application comprising a plurality of instructions which are configured to, when executed by the processor cause the device to: determine a current position of a user using Global Positioning System data; consult map data to identify a route having a starting and/or ending position within a predefined proximity to the current position of the user, the route having a known length; receive data collected by the accelerometer as the user traverses the route; and calculate a calibration factor representative of at least one physiological parameter of the user based at least in part on the known length and the received step data.

BRIEF DESCRIPTION OF THE FIGURES

The above-described features and advantages, as well as others, should become more readily apparent to those of ordinary skill in the art by reference to the following detailed description and the accompanying figures in which.

Figure 1:
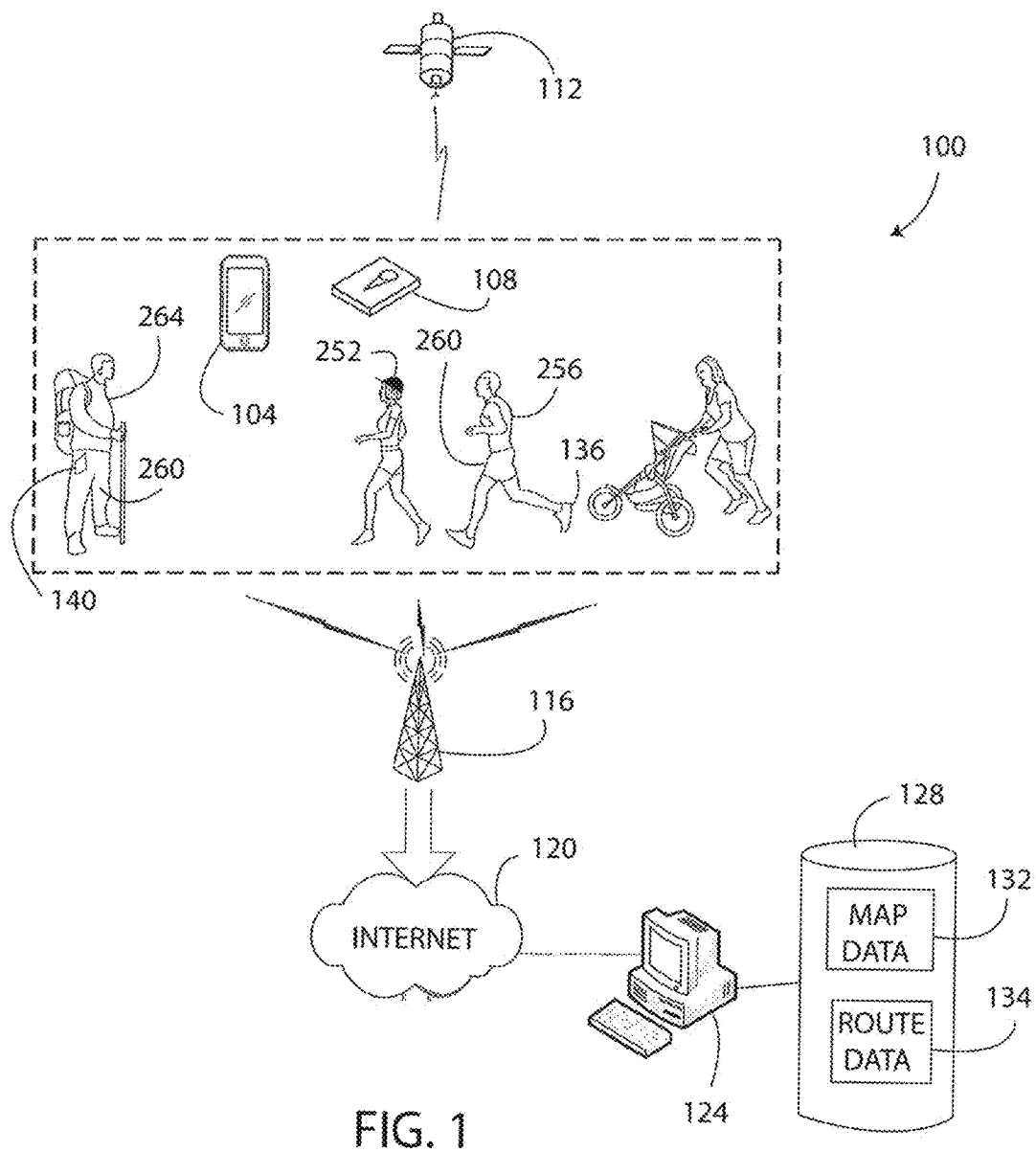
FIG. 1 is a diagram illustrating an activity tracking system for use in calibrating data collected by a measuring device to one or more physiological parameters of an individual user using map data in accordance with one embodiment of the present disclosure.

All Figures © Under Armour, Inc. 2016. All rights reserved.

DETAILED DESCRIPTION

Disclosed embodiments include systems, apparatus, methods and storage medium associated with device calibration in general, and in particular calibrating an activity tracking system using map data.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

As shown in FIG. 1, an activity tracking system 100 in one embodiment includes a personal electronic device 104 and a measuring device 108 configured for use with a GPS satellite 112, a cellular network 116, the Internet 120, and a remote computer 124 including a memory unit 128 having map data 132 and route data 134.

In the illustrated embodiment, the personal electronic device 104 comprises a smartphone, however, other apparatus including a tablet computer, or other semi-portable device may be utilized. The measuring device 108 in one embodiment, comprises a distance measuring device having an accelerometer, a pod, or other sensor device. In one embodiment, the measuring device 108 is configured for placement in a shoe 136, may be attached to the shoe 136, may be carried in a pocket 140 of the user's clothing, and/or may be attached to any portion of the user or the user's clothing. In another embodiment, the measuring device 108 includes a strap (not shown) to mount the device 108 onto the user. In this embodiment, the measuring device 108 may be strapped to the user's wrist, ankle, or worn around the chest of the user. In at least one embodiment, the measuring device 108 is provided as a watch or a watch-like electronic device. In a further embodiment, the measuring device 108 is included in a heart rate monitoring device (not shown) that is worn around the wrist, chest, or other body location that is typically used to measure heart rate. In an alternative embodiment, the measuring device 108 is mounted (permanently or removably) on the user or the user's clothing, footwear or other article of apparel using any of various mounting means such as adhesives, stitching, pockets, or any of various other mounting means. Accordingly, at least the measuring device 108 is configured to be located proximate to the user during activities such as hiking, running, jogging, walking, and the like; whereas the personal electronic device 104 may be left behind or remote to the user during the user's physical activity. In a further embodiment, which is discussed in greater detail at FIG. 12, the components of the measuring device 108 are included as part of the personal electronic device 104'.

Figure 2:
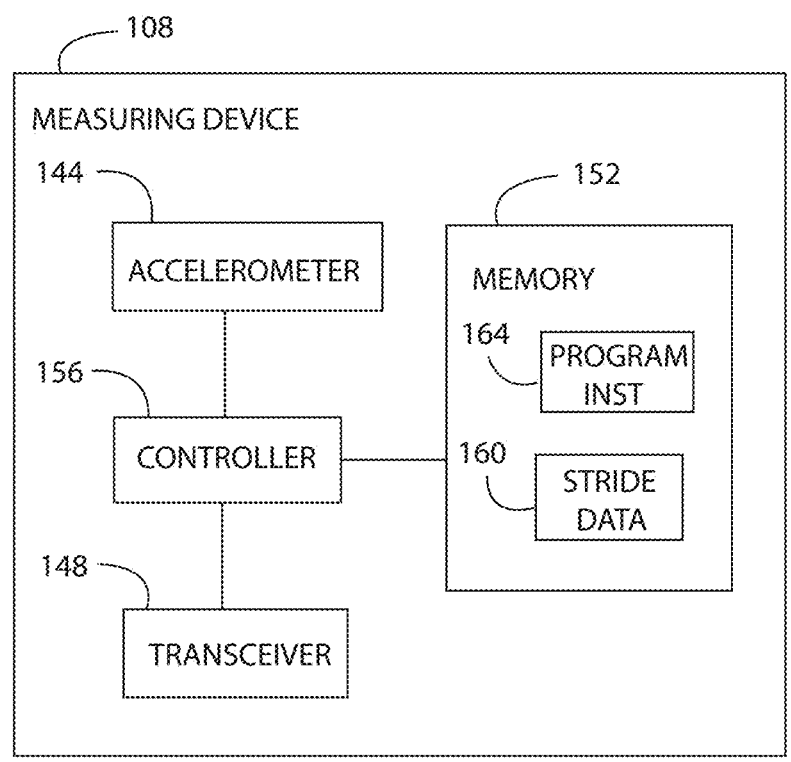
FIG. 2 is a block diagram illustrating components of an exemplary measuring device of the activity tracking system of FIG. 1, the measuring device of the given embodiment including an accelerometer configured to generate stride data.

The measuring device 108, which is also referred to herein as a monitoring device, a health parameter monitoring device, a distance monitoring device, and/or an activity monitoring device, comprises an accelerometer 144, a transceiver 148, and a memory 152 each of which is operably connected to a controller 156, in the embodiment of FIG. 2. The memory 152 stores step data (which is also referred to herein as stride data) 160 and program instructions 164. The accelerometer 144 is configured to generate the stride data 160 while being carried, worn, and/or utilized by the user. The stride data 160 may comprise a number of steps and/or a step rate (i.e., the speed at which the user takes steps, such as 60 steps per minute); such data may be used by the personal electronic device 104 to determine a distance traversed by the user as discussed elsewhere herein. The accelerometer 144 is provided as any type of accelerometer, such as a single-axis or a multi-axis microelectromechanical (MEMS) accelerometer. In other embodiments, the accelerometer 144 is provided as any type of accelerometer or other device configured to generate the step data 160.

Figure 3:
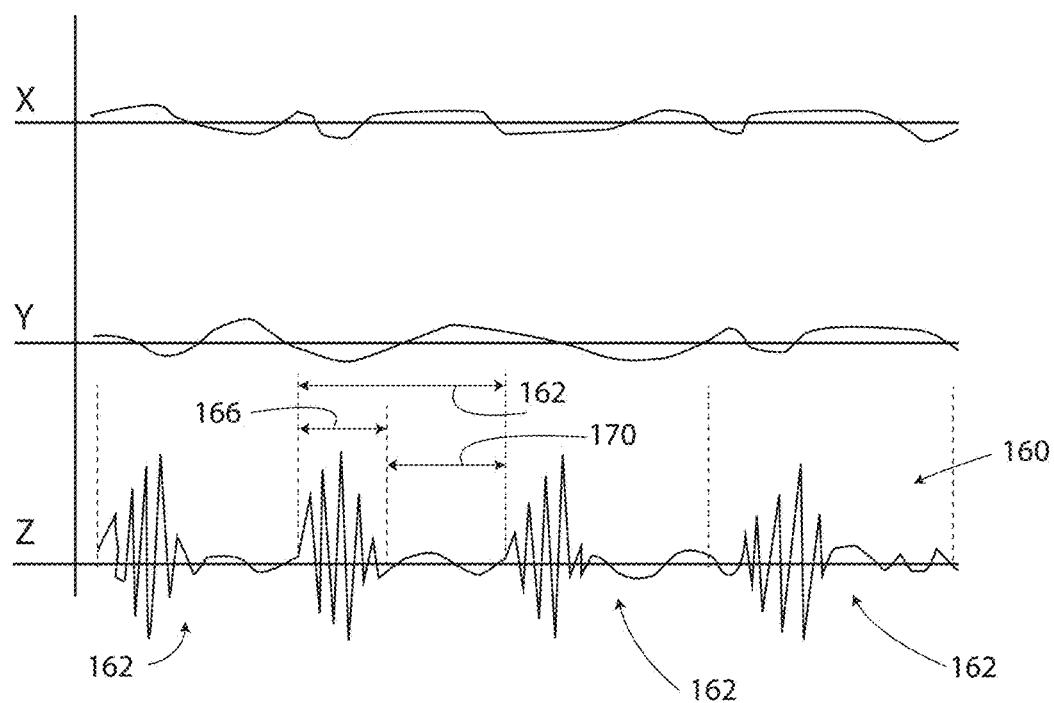
FIG. 3 is a graph plotting the amplitude of exemplary stride data versus time as generated by a three-axis accelerometer such as that of the measuring device of the embodiment of FIG. 2.

With reference to FIG. 3, the amplitude of a data set generated by an exemplary three-axis accelerometer 144 is plotted verses time. The plotted data was generated while the user was walking, running, or otherwise moving while carrying the measuring device 108 or otherwise having the device 108 connected, attached, and/or integrated to his/her person or articles of clothing/footwear. In the illustrated example, "X" axis data and "Y" axis data are associated with accelerometers 144 positioned to measure acceleration in axes that are substantially parallel to the ground, and "Z" axis data are associated with an accelerometer 144 configured to measure acceleration in an axis that substantially perpendicular to the ground. The "Z" axis data includes substantially periodic data that corresponds to the vertical acceleration of a walking, running, or moving user. Specifically, the "Z" axis data includes numerous periods 162 each including burst zone data 166 and calm zone data 170. The burst zone data 166 is typically generated when the user's foot strikes the ground. The amplitude and number of peaks of the burst zone data 166 correspond to the force with which the user's foot impacts the ground. As such, a heavier user and/or a user that is running fast will typically generate burst zone data 166 having an average amplitude that is greater than a lighter user and/or a user that is running slowly or walking.

The burst zone data 166 corresponds to alternating foot strikes of the user, for example, the first and third burst zone data 166 correspond to left foot strikes and the second and fourth burst zone data 166 corresponds to right foot strikes. The calm zone data 170 is typically generated by the accelerometer 144 between foot strikes of the user. The "Z" axis data includes four periods 162 of burst zone data 166 and calm zone data 170. The "X" axis data and "Y" axis data, in this example, are typically not used to determine the distance traversed by the user, because the data do not include clearly defining burst zones and clam zones. Thus, the "Z" axis corresponds to the stride data 160 and the "X" axis data and "Y" axis data do not correspond to the stride data 160, because, in this example, the "Z" axis is oriented vertically. If, however, the accelerometer 144 is rotated to a different orientation, then another one or more of the accelerometers 144 may generate the stride data 160. As such, in other orientations, the stride data 160 may be generated on any one or more of the axes by any one or more of the accelerometers 144. For example, if the accelerometer 144 is positioned to cause the "Y" axis to be oriented vertically, then at least the "Y" axis data corresponds to the stride data 160. The program instructions 164 configure the controller 156 to determine which of the accelerometers of a multi-axis accelerometer 144 is/are generating the best and/or most useful stride data 160.

The duration of each period 162 is related to a stride length of the user. Stride length is the distance traveled per step of a walking or running user. The stride length of a user is typically measured from heel-strike to heel-stride, toe-strike to toe-strike, or from any two corresponding foot portions of a walking or running user. In some instances, such as when a user is running, a longer period 162 corresponds to a longer stride length and a shorter period 162 corresponds to a shorter stride length. The program instructions 164 enable the controller 156 to estimate the user's stride length based at least on the amplitude of the burst zone data 166, the length of the period 162, and the number of pulses in the burst zone data 166. In some embodiments, the stride length is also estimated based on the user's sex, height, age, and/or weight, which, along with the stride length, are stored as calibration data 212 in the memory 152 or the memory 184.

Figure 3A:
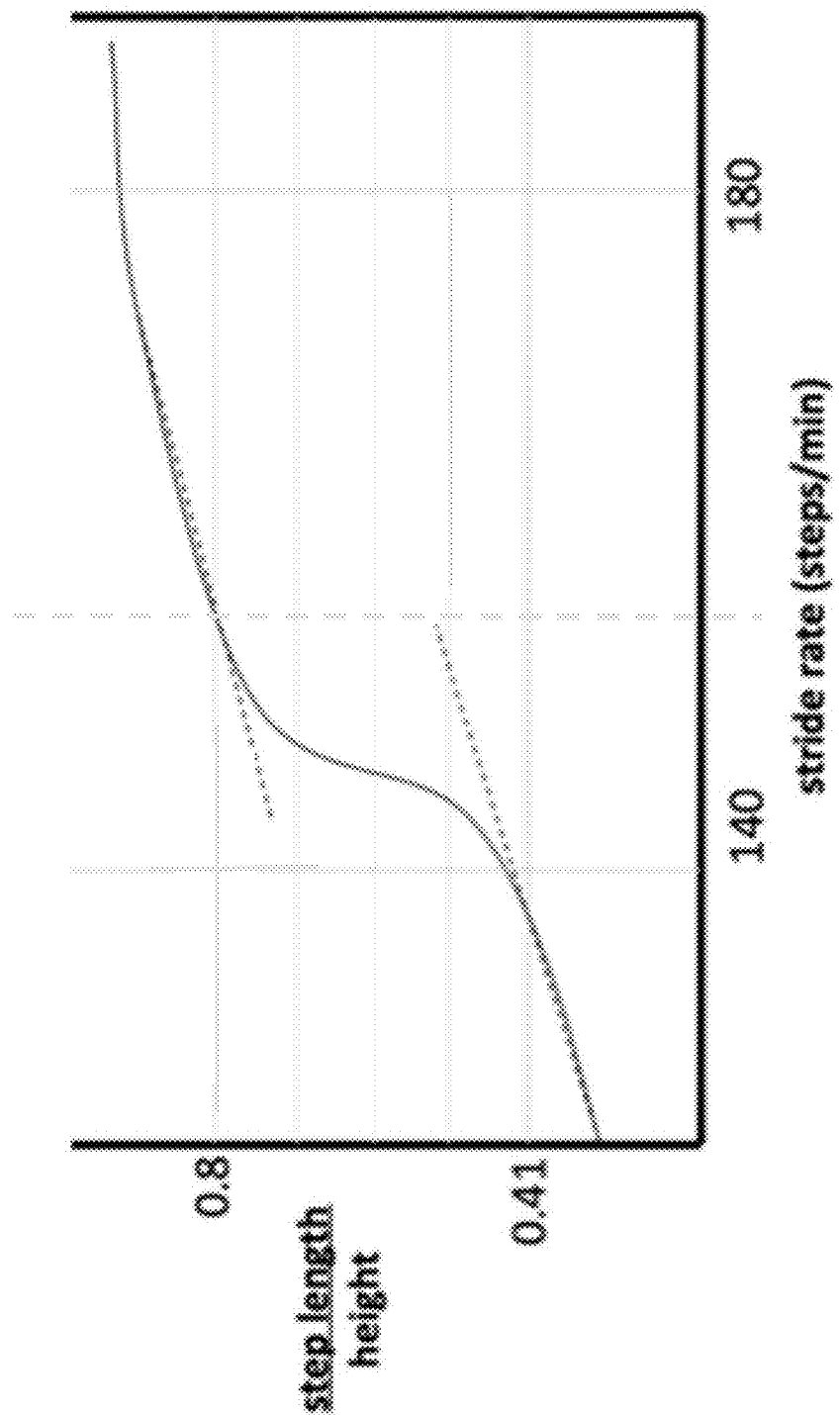
FIG. 3A is a graph plotting the stride length of a typical user versus speed.

Stated differently, the user's stride length varies as a function of the user's speed. As shown in FIG. 3A, as the user increases his/her speed (e.g., stride rate in steps per minute), the user's stride length rapidly changes from a factor of roughly 0.41 times the user's height, to roughly 0.8 times the user's height. Therefore, as discussed elsewhere herein, calibration which is based on a user's height is always incorrect when used by a person who is running (in the instance the calibration factor is set for a walking stride length or 0.41), and/or when used by a person who is walking (in the instance the calibration factor is set for a running stride length or 0.8). A solution which accounts for this problem in calibrating according to a user's height during running versus walking is provided elsewhere herein. However, in certain embodiments, such height based calibration may be relied upon (e.g., when it is known that a user is running or walking, such as via user input thereof).

Referring again to FIG. 3, the stride length along with the number of periods 162 is usable to determine a distance traversed by the user. The distance traversed is determined by multiplying the stride length by the number of periods 162. In an example, an estimated stride length is one meter (1 m) and each period corresponds to a distance of one meter (1 m), such that a rate of one meter per period (1 m/pd) is established. Following this example and using the stride data 160 of FIG. 3, the total distance traversed by the user is about four meters (4 m) since four periods 162 (4 pd) are illustrated (i.e., 4 pd×1 m/pd=4 m). Determining distance traveled when the user has a variable stride length (such as based on speed as discussed above), is performed in one embodiment by determining the user's average speed and selecting and/or calculating an appropriate calibration factor based thereon (discussed elsewhere herein).

With reference again to FIG. 2, the transceiver 148, which is also referred to as a wireless transmitter and/or receiver, is configured to transmit and to receive data from the personal electronic device 104. In one embodiment, the transceiver 148 is configured for operation according to the IEEE 802.15.1 ("Bluetooth®") wireless data transmission standard. In other embodiments, the transceiver 148 comprises any desired transceiver configured to wirelessly transmit and receive data using a protocol including, but not limited to, Near Field Communication ("NFC"), IEEE 802.11, Global System for Mobiles ("GSM"), and Code Division Multiple Access ("CDMA").

The memory 152 is an electronic data storage unit, which is also referred to herein as a non-transient computer readable medium. The memory 152 is configured to store program instruction data 164 and the stride data 160 generated by the accelerometer 144, as well as any other electronic data associated with the activity tracking system 100, such as user profile information, etc. The program instruction data 164 includes computer executable instructions for operating the measuring device 108 and calibration as discussed herein.

The controller 156 is configured to execute the program instruction data 164 for controlling the accelerometer 144, the transceiver 148, and the memory 152. The controller 156 is a provided as a microprocessor, a processor, or any other type of electronic control chip.

Figure 4:
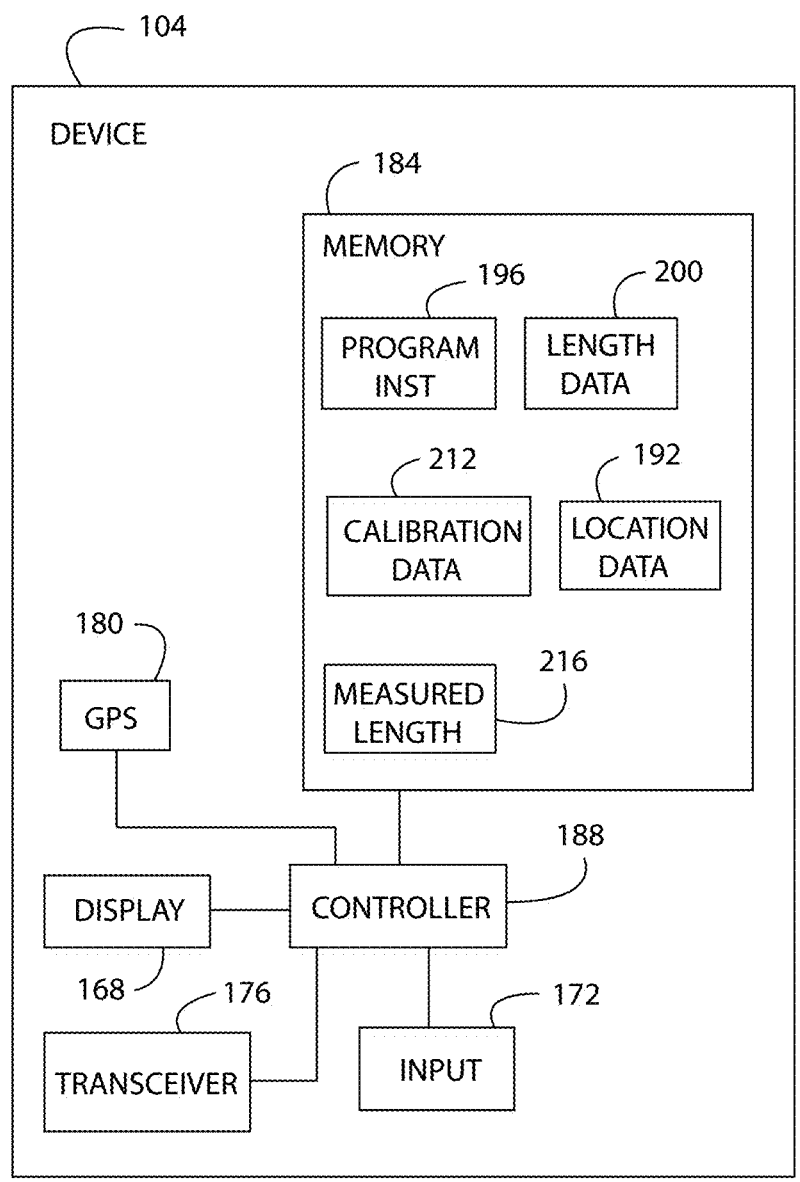
FIG. 4 is a block diagram illustrating components of an exemplary personal electronic device of the activity tracking system of FIG. 1.

With reference to FIG. 4, an exemplary personal electronic device 104 is shown including a display unit 168, an input unit 172, a transceiver 176, a GPS receiver 180, and a memory 184 each of which is operably connected to a controller or processor 188. The display unit 168 may comprise a liquid crystal display (LCD) panel configured to display text, images, and other visually comprehensible data. The display unit 168, in another embodiment, is any display unit as desired by those of ordinary skill in the art, including, but not limited to, an active-matrix organic light-emitting diode display. In one embodiment, the display 168 further comprises one or more mechanisms capable of receiving user inputs. For example, the display 168 may comprise a touch screen and/or various fields in which the user may enter text. The display 168 is configurable to e.g., display one or more interactive interfaces or display screens to the user including a display of a distance traversed by the user. For example, the activity tracking system 100 is usable to determine distance run by the user during a workout and to display the distance on the display 168.

The input unit 172 is configured to receive data input via manipulation by a user. The input unit 172 may be configured as a touchscreen applied over the display unit 168 that is configured to enable a user to input data via the touch of a finger and/or a stylus. In another embodiment, the input unit 172 comprises any device configured to receive input data, as may be utilized by those of ordinary skill in the art, including e.g., via one or more buttons, switches, keys, and/or the like.

The transceiver 176, which is also referred to as a wireless transmitter and/or receiver, is configured to wirelessly communicate with the transceiver 148 of the measuring device 108 either directly or indirectly via the cellular network 116 (FIG. 1), a wireless local area network ("Wi-Fi"), a personal area network, and/or any other wireless network. Accordingly, the transceivers 148, 176 are compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

As shown in FIG. 4, the GPS (Global Positioning System) receiver 180 is configured to receive GPS signals from the GPS satellite 112 (FIG. 1). The GPS receiver 180 is further configured to generate location data 192 that is representative of a current location on the Earth of the personal electronic device 104 based on the received GPS signals. The location data 192, in one embodiment, includes latitude and longitude information. The controller 188 is configured to store the location data 192 generated by the GPS receiver 180 in the memory 184. In alternative embodiments, the location data may be provided in any other form, such as Geographic Information System ("GIS") data or as data input by the user with the input unit 172.

The memory 184 is an electronic data storage unit, which is also referred to herein as a non-transient computer readable medium. The memory 184 is configured to store the location data 192, program instruction data 196, length data 200, calibration data 212, and measured length data 216, as well as any other electronic data associated with operating the personal electronic device 104 and the measuring device 108 (e.g., profile data, etc.). The program instruction data 196 includes computer executable instructions for calibrating the data received from the accelerometer 144 of the measuring device 108 to one or more physiological parameters of a user of the activity tracking system 100, as explained in further detail below. The length data 200, calibration data 212, and measured length data 216 will be addressed in greater detail elsewhere herein as well. In another embodiment, the memory 184 may further store data relating to the one or more physiological parameters of each user.

The controller or processor 188 is configured to execute the program instruction data 196 in order to control the display unit 168, the input unit 172, the GPS receiver 180, the transceiver 176, the memory 184, and the measuring device 108. The controller 188 is a provided as a microprocessor, a processor, or any other type of electronic control chip.

With reference again to FIG. 1, the map data 132 is stored in the memory unit 128 that is electrically connected to the remote computer 124. The map data 132 includes electronic data that is associated with a map of the area in which the user is located. The map data 132 includes the location and configuration of the streets, paths, sidewalks, and other traversable portions of the area. The map data 132 may also include information associated with the topography of the area, such as the elevation, altitude, terrain type, and natural features in the area including lakes, ponds, rivers, mountains, and the like. In addition, the map data may include a gradient or altitude change over a particular length or distance and/or information relating to a relative rate of decline or rate of incline over a particular length or distance. In at least one embodiment, the map data 132 includes or is formed from geo-data including, but not limited to, GIS data, satellite imagery, aircraft imagery, and electronic views of streets. While the map data 132 may include latitude and longitude data, the map data 132 does not include GPS data in one exemplary embodiment. The map data 132 includes an associated scale that is usable to determine the length of any portion of the area. For example, the map data 132 indicates that a particular portion of a street is 5,000 pixels in length. It is appreciated that other measurement units may be utilized with equal success. The scale of the map data 132 indicates that 10,000 pixels correspond to one kilometer in this embodiment. Accordingly, the particular portion of the street is 0.5 kilometers in length, because 5,000 divided by 10,000 equals 0.5.

As also indicated in FIG. 1, the route data 134 is stored in the memory unit 128 that is electrically connected to the remote computer 124. In one embodiment, the route data 134 is processed by the controller 188 of the personal electronic device 104 and is representative of at least one route (e.g., a calibration route 224) for calibrating the accelerometer 144. In one variant, the calibration may comprise a calibration in order to accurately determine a distance traversed by the user, as described in further detail below with respect to FIG. 6. The route data 134, in another embodiment, is a subset of the entire map data 132 that includes at least one segment of the calibration route (e.g., route 224).

The remote computer 124 is a typical computer device that is in data communication with the Internet 120. The remote computer 124, in at least one embodiment, is a server and the personal electronic device 104 is a client that is served data from the server. In one embodiment, data may be pushed periodically and stored at the electronic device 104; alternatively, at each instance or query, data may be accessed from the remote computer 124 by the electronic device 104.

In operation, the activity tracking system 100 is configured to implement a calibration process for calibrating the data collected by the activity tracking system 100, including the monitoring device 108, to one or more physiological parameters of a user of the activity tracking system 100. In one embodiment, the calibration process generally comprises first determining a route 224. The route 224 has a known length and a known gradient change 262 (FIG. 8) which are obtained from map data relating to the route 224. The map data comprises geo-data which is accessed without the use of a Global Positioning System (GPS). It is appreciated that in one variant, the route 224 is determined by identifying a current location of the user (such as by using GPS data) and identifying one of a plurality of pre-determined routes having a starting and/or ending position within a predefined proximity to the current location of the user. Next, step data is collected from the monitoring device 108 as the user traverses the route 224 (the step data may include e.g., a number of steps taken, a step speed, etc.).

Moreover, the monitoring device 108 is calibrated to one or more physiological parameters of the user based on an estimate of at least one physiological parameter of the user. The physiological parameters of the user may comprise features of the user's walk, run, or jog that include e.g., step rate, stride rate, step speed, stride speed, step length, and/or stride length. The estimate may, in one embodiment, be based on the step data or stride data 160 and the known length and gradient change 262 (FIG. 8) of the route 224. Thereafter, subsequently obtained data from the monitoring device 108 is automatically calibrated to the user. This and other embodiments for calibration will be discussed below.

In one specific embodiment, discussed in greater detail below, the physiological parameter which is estimated comprises the user's stride length and the step data comprises a number of steps taken by the user when traversing the known route 224. This information is used to arrive at a "measured distance" by multiplying the number of steps taken by the user as he/she traversed the known route 224 by the estimated stride length. According to this embodiment, the calibration comprises dividing the known length of the route 224 by the measured distance, and storing the result as a calibration factor in the memory 152, 184 of the activity tracking system 100 for use in automatically calibrating subsequently obtained data.

Figure 5:
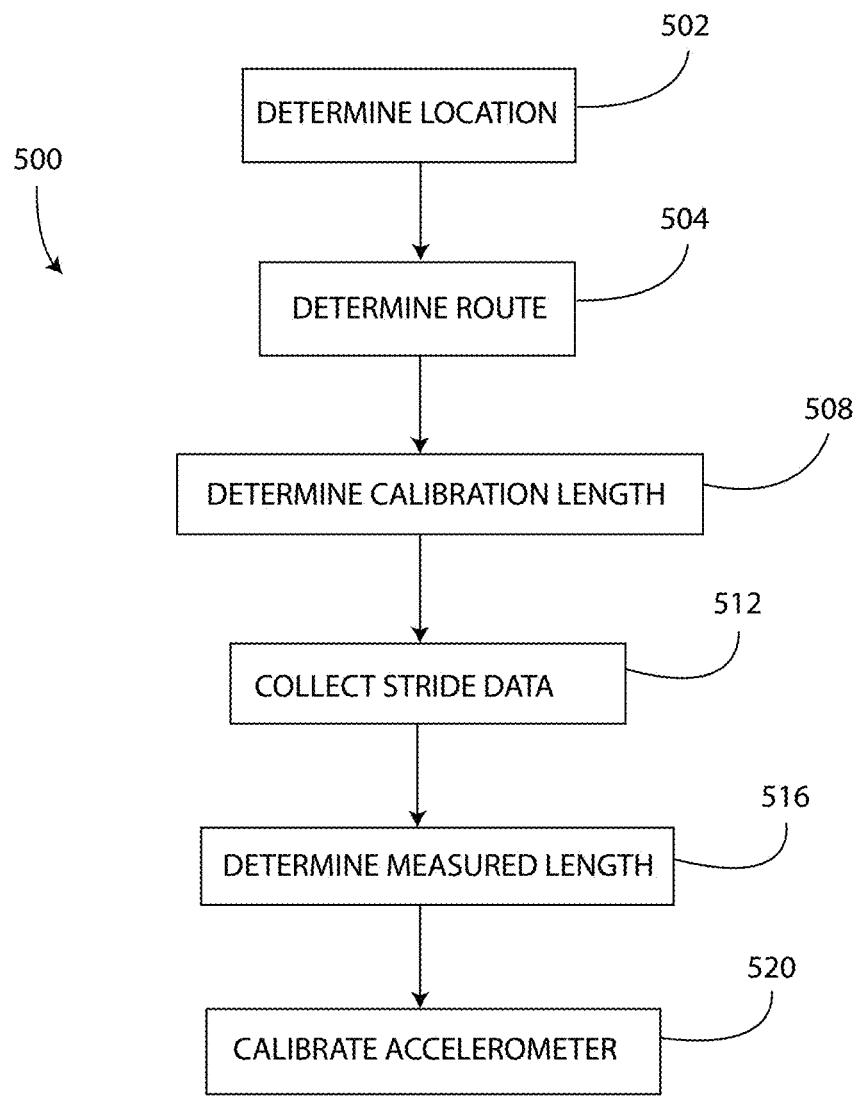
FIG. 5 is a logical flow diagram illustrating a first exemplary method for calibrating the activity tracking system of FIG. 1.

One specific embodiment of a calibration method 500 is illustrated by the flowchart of FIG. 5. Specifically, the activity tracking system 100 is configured to determine calibration data 212 which is used to calibrate the accelerometer 144 of the measuring device 108 in order to accurately determine a distance traversed by a particular user, by executing the program instructions 164 stored in the memory 152 of the measuring device 108 and/or by executing the program instructions 196 stored in the memory 184 of the personal electronic device 104, however other networks may be used with equal success.

Figure 6:
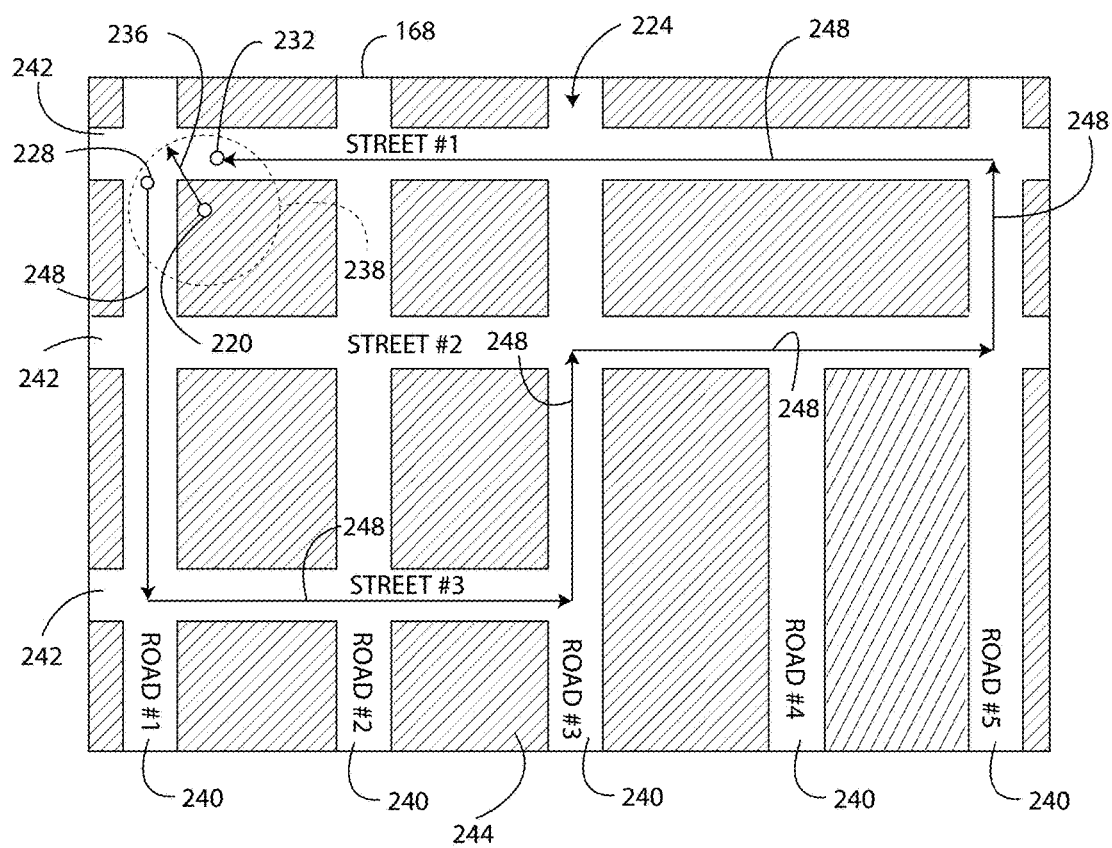
FIG. 6 is a diagram illustrating exemplary map data and a calibration route as determined by the activity tracking system of FIG. 1.

The calibration process 500 is described with reference to FIG. 6, which is top plan view of an exemplary neighborhood including five roads 240 (Roads #1-#5) and three streets 242 (Streets #1-#3), between which are exemplary buildings 244. In this example, the roads 240 and streets 242 are lined with sidewalks (not shown) for pedestrians. Of course, the calibration process 500 could be performed in any other location and, as such, in another embodiment, the roads 240 may represent paths, and the buildings 244 may represent groups of trees, lakes, fields, or any other area including non-traversable or non-easily-traversable areas. FIG. 6 shows a user at location 220, near the intersection of street #1 and road #1. The user is located off the street 228, such as on the sidewalk or at another pedestrian area. The activity tracking device 100 will be calibrated to the user according to the method 500 of FIG. 5.

The calibration process 500 in block 502 of FIG. 5 includes determining the current location 220 of the user, and storing the current location 220 as location data 192 in the memory 184 of the personal electronic device 104. The current location 220 is determined using the GPS receiver 180 or by any other geo-location determining process. In one embodiment, if GPS signals are unavailable, the current location 220 is determined based on the cellular network 116 to which the transceiver 176 is connected, using known location determining processes. The current location 220 may also be determined with user supplied data, such as street address data or the like, using the input device 172. Thus, GPS satellite 112 (FIG. 1) is not required in order to determine the current location 220 of the user, but rather provides one option for determining the current location 220.

After determining and storing the current location 220 as location data 192, the personal electronic device 104 uses the transceiver 176 to send the location data 192 (including current location 220) and an electronic request for one or more route(s) 224 to the remote computer 124 (FIG. 1). The data sent by the personal electronic device 104 typically travels across the Internet 120 (FIG. 1) to the remote computer 124.

As shown in block 504 of FIG. 5, the remote computer 124 identifies route data 134 corresponding to one or more routes 224 that are located near the current location 220 and that are of a suitable length for the particular user to traverse. In one variant, the length of the route 224 is selected to be as short as possible to arrive at the necessary data and in certain instances may be a nominal distance. The remote computer 124 processes the map data 132 near the current location 220 to determine the route data 134. As shown in FIG. 6, the given route 224 derived from the route data 134 is represented by six segments 248. The route 224 may include any other number of segments 248, but typically includes from one to twenty segments. The route 224 may include any type of terrain that is indicated by the map data 132 as being traversable by a pedestrian. Accordingly, the route 224 may include areas such as streets, sidewalks, walking paths, biking paths, unpaved paths, indoor paths, indoor tracks, and the like.

The route 224 has a starting point 228 and an ending point 232 based on the current location 220. In one embodiment, the starting point 228 and the ending point 232 are both within a predetermined distance 236 of the current location 220. An exemplary predetermined distance 236 is approximately 0.1 km to 0.25 km, such that the user does not have to travel far to reach the beginning of the route 224. In this example, the starting point 228 and the ending point 232 are located within the dotted circle 238, which has radius of the predetermined distance 236. Moreover, points located within the dotted circle 238 are within a predefined proximity to the current location 220 of the user. Thus, the starting point 228 and the ending point 232 are both within a predefined proximity to the current location 220 of the user. In FIG. 6, the starting point 228 and the ending point 232 are at different locations. In another embodiment, the starting point 228 and the ending point 232 are at the same location. Moreover, in some embodiments, at least one of the starting point 228 and the ending point 232 are the same (or substantially the same as) the current location 220.

In generating a route 224 of suitable length for the particular user, the remote computer 124 ensures that the route 224 is long enough to generate enough stride data 160 for calibrating the accelerometer 144. An exemplary length is about 0.5 kilometers; however, depending at least on the current location 220 and the preferences of the user, the length may be as little as about 0.1 km to about five kilometers. Alternatively, the length of the route 224 is any length as input by the user.

The controller 188 may factor in the user's height, age, sex, physical fitness level, and number of times per week the user typically exercises in determining the length of the route 224. The controller 188 may also factor in the terrain type and the weather near the current location 220 in determining the length of the route 224. For example, if the current location 220 is located in a mountainous terrain, the controller 188 may generate a shorter route 224 due to the increased difficulty that users typically experience in traversing mountainous terrain, as compared to a flat city street.

In another variant, the controller 188 may factor in the weather, as determined with weather data from the Internet 120, in determining the duration of the route 224. For example, if weather data indicates high humidity or that the temperature is abnormally hot at the current location 220, then the controller 188 may adjust the length of the route 224 to ensure that the user finishes traversing the route 224 in a reasonable time based on the temperature, humidity, and the user's average speed while walking or running with the activity tracking system 100. In another example, if the weather data indicates that a storm is approaching, then the controller 188 may adjust the length of the route 224 to ensure that the user finishes traversing the route 224 before the arrival of the storm at the current location 220 and/or the ending point 232 using the user's average speed while walking or running with the activity tracking system 100. According to another embodiment, the length of the route 224 may be substantially the same as an average distance run by the user while using or wearing the activity tracking system 100.

After determining a desired length of the route 224, the remote computer 124 processes the map data 132 to determine one or more routes 224 that are substantially the same length as the desired length. For example, in FIG. 6 the desired length is 1.3 km, accordingly the remote computer 124 processes the map data 132, which includes data corresponding to the location of the roads 240, the streets 242, and the lengths thereof, to arrive a series of segments 248 having a combined length that is substantially 1.3 km. Starting from the starting point 228, the lengths of the exemplary segments 248 are 0.2 km, 0.2 km, 0.1 km, 0.2 km, 0.1 km, and 0.4 km for a total length of 1.2 km, which is only 0.1 km different than the desired route length of 1.3 km. A predetermined threshold level of variance may be included in the system and/or entered by an operator in one embodiment.

With reference to block 508 of FIG. 5, after determining a suitable route 224 the remote computer 124 stores length data 200 which is representative of a known length of the route 224. The known length is based, at least in part, on the map data 132. In determining the length data 200, the remote computer 124 processes the route data 134 and the map data 132, in one embodiment, without any reference to the GPS satellite 112. In particular, the remote computer 124 determines the known length of the route 224 using the scale of the map represented by the map data 132. No GPS signal or GPS data is used to determine the known length of the route 224 in one variant. Accordingly, the desired length of the route 224 represents an approximate length of the route 224, and the known length of the route 224 represents a substantially exact length of the route 224 as determined using the map data 132. Hence, the known length is as accurate as the map represented by the map data 132.

Using map data 132 to determine the known length of the route 224 is accurate, fast, and convenient. The process of determining the known length may be conducted at any location in which electronic access to the map data 132 is available. Accordingly, the known length may be determined in dense city areas where GPS signals are spotty or blocked by urban structures. Moreover, in an embodiment in which the map data 132 is stored on the memory 184 of the personal electronic device 104, the known length may be determined without communicating with another computing device, such as the remote computer 124. Accordingly, the known length may be determined without access to the cellular network 116, Internet 120, and/or the GPS satellite 112.

Figure 7:
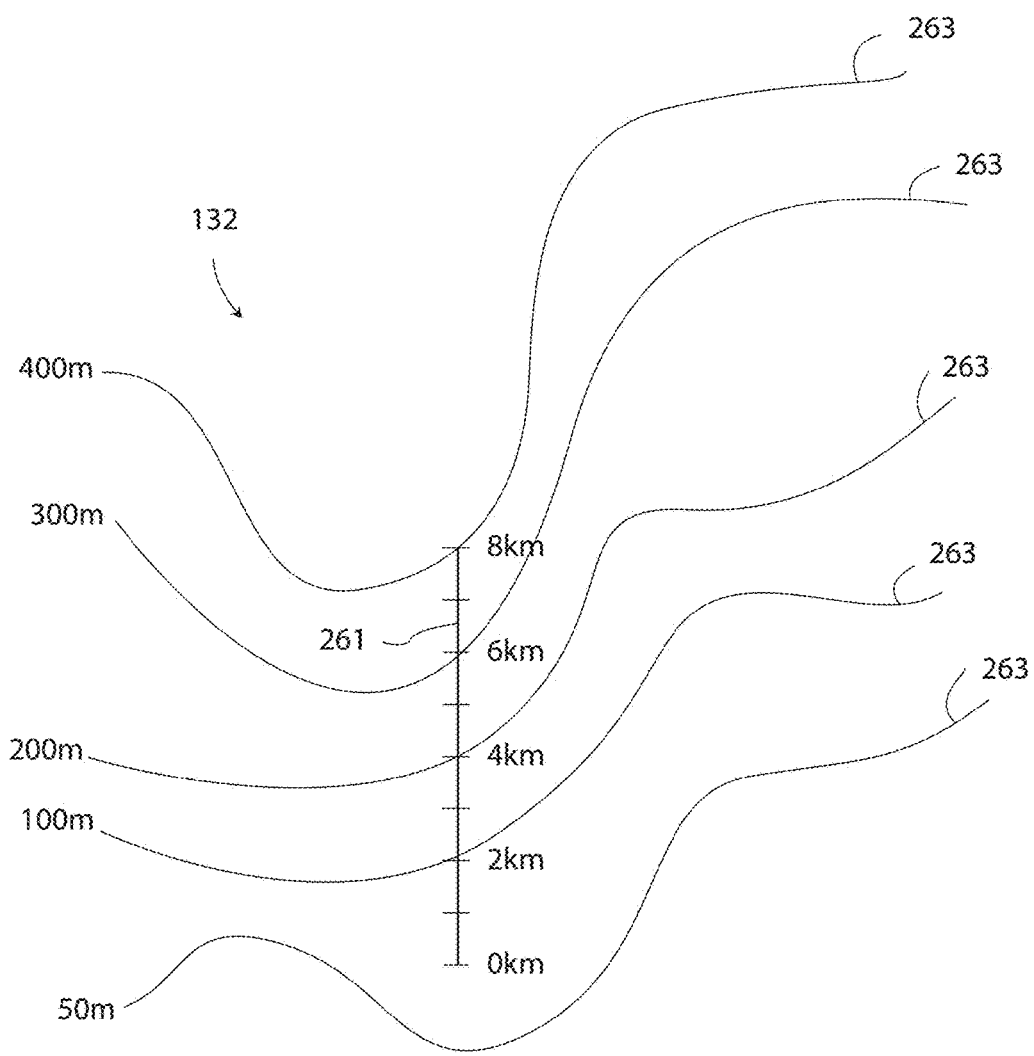
FIG. 7 is a diagram illustrating exemplary map data, a calibration route, and several contour lines depicting altitude.

As shown in FIG. 7, the map data 132 is also used to determine an altitude or gradient change of the route 224. FIG. 7 illustrates another exemplary route 261 and five contour lines 263 that identify areas represented by the map data 132 having an equal elevation. The route 261 crosses the contour lines 263; therefore, according to the map data 132 as the user traverses the route 261, the user undergoes an altitude change 262 (FIG. 8) (also referred to herein as an elevation change) that can be determined from the map data 132. In one embodiment, the altitude or gradient change 262 is determined by subtracting the altitude or elevation of the user at the end of the route 261 from the altitude or elevation of the user at the beginning of the route 261. As set forth below, the altitude change 262 may be used in addition to the scale of the map data 132 to accurately determine the known length of the route 261. The altitude is calculated as a height above sea level or any other desired reference point.

According to the example of FIG. 7, the route 261 begins at about 75 m above sea level and increases to about 100 m above sea level at the 2 km mark. At the 4 km mark, the altitude of the route 261 increases to about 200 m above sea level, and at the 6 km mark the altitude of the route 261 increases to about 300 m above sea level. At the 8 km mark, the route 261 ends at an altitude of about 400 m above sea level. Thus, the user has experienced an altitude change 262 of about 325 m (i.e. 400 m−75 m=325 m).

Figure 8:
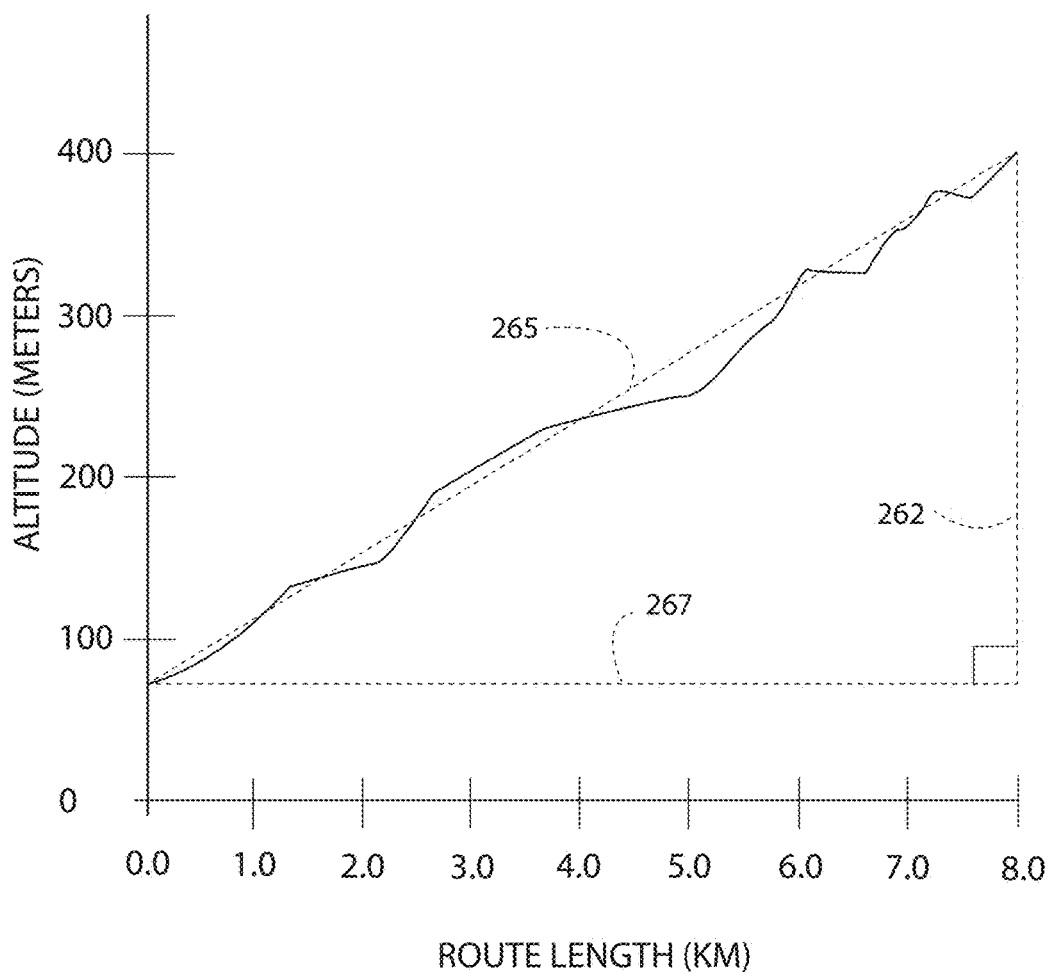
FIG. 8 is a graph plotting an exemplary altitude verses length of the calibration route of FIG. 7.

With reference to FIG. 8, the altitude of the route 261 of FIG. 7 is plotted verses the length of the route 261 to illustrate the altitude change 262 experienced by the user as the user traversed the route 261. The format of the data in FIG. 8 is useful for illustrating how the controller 188 uses the altitude change 262 to more accurately determine the length of the route 261 from the map data 132. In particular, the length of the route 261 as measured along the horizontal axis represents a straight-line length 267 of the route 261 as would be determined from the scale of the map data 132. However, since the user underwent a somewhat substantial change in altitude while traversing the route 261, the user traversed a longer distance than is represented by the straight-line length 267. The longer distance is represented by an altitude adjusted length 265 of FIG. 8.

In one embodiment, the altitude adjusted length 265 is determined using the straight-line length 267 and the altitude change 262. For example, the altitude adjusted length 265 may be calculated as the length of the hypotenuse of the right triangle formed by the straight-line length 267 and the altitude change 262 using the Pythagoras Theorem. In the example of FIG. 8, the straight-line length 267 is 8 km and the altitude change 262 is 325 m, as a result, the altitude adjusted length 265 is 8.007 km (i.e. $\sqrt{(8^2+0.325^2)}$). The altitude adjusted length 265 may be stored in the memory 184 by the controller 188 as the length data 200. In other embodiments, the altitude change 262 and the altitude adjusted length 265 are not calculated or considered when determining the length data 200.

Next, the remote computer 124 transmits the route data 134, the length data 200, and the map data 132 from the remote computer 124 to the personal electronic device 104. In one embodiment, the data 132, 204, 220 are transferred over the Internet 120, to the cellular network 116, and then to the transceiver 176 of the personal electronic device 104. However, other communication schemes may be utilized as well. The controller 188 stores the data 132, 204, 220 in the memory 184.

In one embodiment, the transferred map data 132 and route data 134 of FIG. 6 are displayed to a user via the display unit 168 of the personal electronic device 104. The route data 134 is overlaid upon the map data 132 as the segments 248 so that the user may review and if possible remember or memorize the route 224. Typically, the route 224 is a simple loop so that the user is not required to remember a complex set of directions. As an alternative to remembering the route 224, the user may glance at the display unit 168 while traversing the route 224; however, the calibration mechanism discussed herein does not require that the user carry the personal electronic device 104 while traversing the route 224 (except in the instance where the device 104 comprises the same device utilized as the measuring device 108).

Next, at block 512 of the calibration process 500 of FIG. 5, the user traverses the route 224 while carrying or otherwise having at least the measuring device 108. During traversal of the route 224, the measuring device 108 collects the stride data 160 generated by the accelerometer 144 (see e.g., FIG. 3). To carry the measuring device 108, the user may place the device 108 in a jacket pocket, shirt pocket, pants pocket 140 (FIG. 1), or the pocket of any other article of clothing. Additionally or alternatively, carrying the measuring device 108 includes securing the device 108 to any article of clothing that the user is wearing. In another specific embodiment, carrying the measuring device 108 includes positioning the device 108 in a specially designed cavity of the user's shoe 136 (FIG. 1). Still further, the measuring device 108 may carried by permanently, semi-permanently, or removably affixing the device 108 to an article of clothing and then wearing the article of clothing. In one embodiment, the measuring device 108 may be affixed to the shoe 136, a hat 252 (FIG. 1), shirt 256 (FIG. 1), pants 260 (FIG. 1), or jacket 264 (FIG. 1) of the user. As used herein, two elements are "permanently affixed" when the elements cannot be separated from each other without destroying at least one of the elements. Also, as used herein, two elements are "semi-permanently affixed" when certain elements are inseparable, yet others are separable during normal usage, such as by a removing fastener that affixes the elements together. Moreover, as used herein, two elements are "removably affixed" when the elements can be separated from each other without destroying or damaging either of the elements, for example, such as by pulling the elements apart from each other to break a hook and loop bond therebetween. Moreover, carrying the measuring device 108 may include e.g., holding the device 108 in the hand of the user, in a pocket, in a bag or purse, etc. while traversing the route 224.

As the user carries the measuring device 108 while traversing the route 224, the controller 156 of the device 108 executes the programs instructions stored as the program instruction data 196 in the memory 184, which cause the controller 156 to collect the stride data 160 and to save the stride data 160 in the memory 184. The stride data 160 is generated when the accelerometer 144 is moved relative the user. That is, as the user engages in an activity, the accelerometer 144 is moved, shaken, jostled, bumped, and the like, in response to the motions of the user. The accelerometer 144 generates the stride data 160 in response to this movement. When the user finishes traversing the route 224, the transceiver 148 (FIG. 2) transfers the stride data 160 to the device 104 for further processing.

Next, with reference to block 516 of FIG. 5, the personal electronic device 104 determines measured length data 216 that is representative of a measured length of the route 224 as determined by the activity tracking system 100 using at least the stride data 160. In one simplified example, assume that the stride data 160 collected as the user traversed a one kilometer route 224 includes 1,100 periods (exemplary periods 162 are identified in FIG. 3) and based on the calibration data 212 (including at least some of sex, height, age, and weight) the controller 188 determines an average stride length of one meter. Accordingly, the controller 188 multiplies the number of periods by the average stride length to arrive at a measured length of 1.1 kilometers. In other embodiments, the measured length is determined with a plurality of "instantaneous" stride lengths based on the amplitude, number of peaks, and frequency of each burst zone data 166 of the stride data 160. The measured length data 216 is the "uncalibrated" length of the route 224. As set forth below, calibration of the accelerometer 144 converts the measured length into a calibrated length that is calibrated to the user's stride.

As shown in block 520, the accelerometer 144 data is calibrated to the user based at least in part on the known length and the measured length in this embodiment. The calibration described herein results in stride data 160 that may be used to accurately determine the distance traversed by the user while carrying the measuring device 108. That is, when the accelerometer 144 data is calibrated, the user may carry the measuring device 108 while running, walking, hiking, or otherwise moving, and the activity tracking system 100 accurately determines the distance traversed while carrying the measuring device 108.

In one embodiment, the calibration comprises generating a calibration factor that is stored in the calibration data 212 of the memory 184 of the personal electronic device 104. The calibration factor is equal to the known length divided by the measured length. In a simplified example, the known length is one kilometer and the measured length is 1.1 kilometers. Thus, the calibration factor is about 0.91. The controller 188 uses the calibration factor to determine an accurate measured length of distances measured by the measuring device 108 by multiplying the measured length by the calibration factor. For example, after determining the calibration factor of about 0.9091, the user goes for a run and the stride data 160 indicates a measured length of 5.5 kilometers. The controller 188 multiplies 5.5 kilometers by the calibration factor of 0.9091 to arrive at a calibrated measured distance of 5.000 kilometers, which is a more accurate measure of the distance traversed by the user. The calibrated measured distance is typically displayed on the display unit 168 so that the user may evaluate the workout in one variant.

The calibration process 500, in one embodiment, is initiated by the user via the input unit 172. In another embodiment, the controller 188 of the personal electronic device 104 is configured to periodically initiate the calibration process 500 automatically and without substantial user intervention. That is, the calibration process 500 may be initiated e.g., every month, or after thirty uses of the measuring device 108, or any other period predetermined by the device manufacturer and/or entered by the user. In another embodiment, the periodic calibration initiation process occurs via the display unit 168 outputting a notification to the user that the measuring device 108 is due for calibration. The user may start the calibration process 500 immediately using the input unit 172, or the user may indicate that the calibration process 500 should be delayed until a more convenient time.

Figure 9:
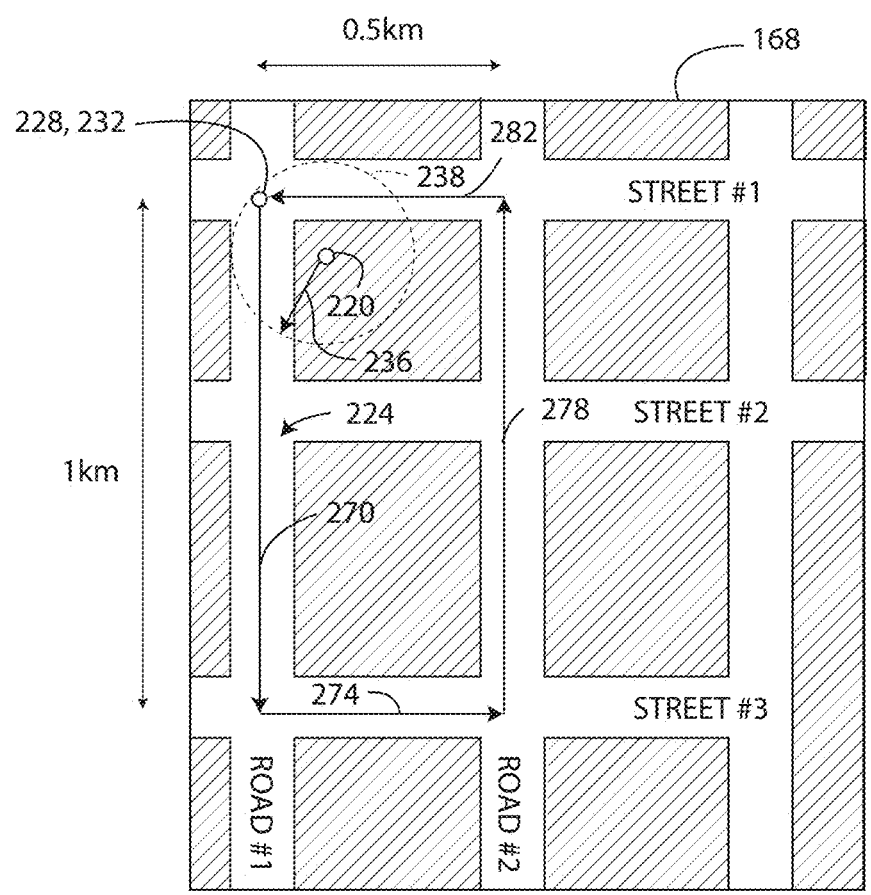
FIG. 9 is a diagram illustrating another exemplary map data and a calibration route as determined the activity tracking system of FIG. 1.

An exemplary set of calculations that may be performed during the calibration process 500 is now described with reference to FIG. 9. The process begins when the user indicates that he or she is prepared to start the calibration process. For example, the user may select a "start calibration" option using the input unit 172 of the personal electronics device 104, which may be carried by the user. After the user indicates that the calibration process should begin, the personal electronic device 104 determines the current location 220 of the user. Then, the remote computer 124 (FIG. 1) generates a route 224 of a suitable length of 3.0 kilometers based at least in part on the user's fitness history as stored in the calibration data 212. The exemplary route 224 has a starting point 228 that is in the same place as the ending point 232. In this example, the starting point 228 and the ending point 232 are located within the dotted circle 238, which has radius of the predetermined distance 236. The route 224 includes four segments 270, 274, 278, 282. The remote computer 124 uses the map data 132 to determine that a known length of the route 224 is 3.0 kilometers. The known length is determined by adding the length of each segment 270, 274, 278, 282 as determined using the map data 132. In this example of FIG. 9, the map data 132 indicates that segments 270 and 278 have a length of one kilometer and segments 274 and 282 have a length of 0.5 kilometers for a total known length of three kilometers.

After the route 224 is generated, the route 224 is presented to the user on the display unit 168 of the personal electronic device 104, and the user is instructed to traverse the route 224. As the user traverses the route 224, the accelerometer 144 generates the stride data 160. At the completion of the route 224, the stride data 160 is transmitted to the transceiver 176 of the personal electronic device 104, and the controller 188 processes the stride data 160 to determine a measured length that the user traveled when traversing the route 224. For example, if the calibration data 212 and the stride data 160 indicate that the user has a stride length of 1.0 meters per stride, and the user takes 2,500 strides (as indicated by 2,500 of the periods 162, for example) to complete the route 224, the controller 188 will determine that the user traveled 2,500 meters to complete the route (i.e., (2,500 strides)×(1.0 meters/stride)=2.5 kilometers. Because this measured 2.5 kilometers is clearly different than the known 3.0 kilometers of the route 224, the accelerometer 144 and the associated stride length of the user clearly requires calibration.

In one embodiment, in order to calibrate the data collected by the accelerometer 144, the controller 188 generates a calibration factor by dividing the known length of 3.0 kilometers (i.e., the known distance of the route 224 is 3.0 kilometers) by the measured length of 2.5 kilometers to arrive at a calibration factor of 1.2, which is stored at the device 104. Based on this calculation, the user's previously determined stride length of 1.0 meters/stride is multiplied by the calibration factor of 1.2 to arrive at a new stride length of 1.2 meters per stride (i.e., (1.0 meters/stride)×(1.2)=1.2 meters/stride). Thereafter, the new stride length is used to determine distance traveled. In other words, calculations for the user will then be made with the new stride length of 1.2 meters per stride until the accelerometer 144 is once again calibrated for the user at a later time.

Figure 10:
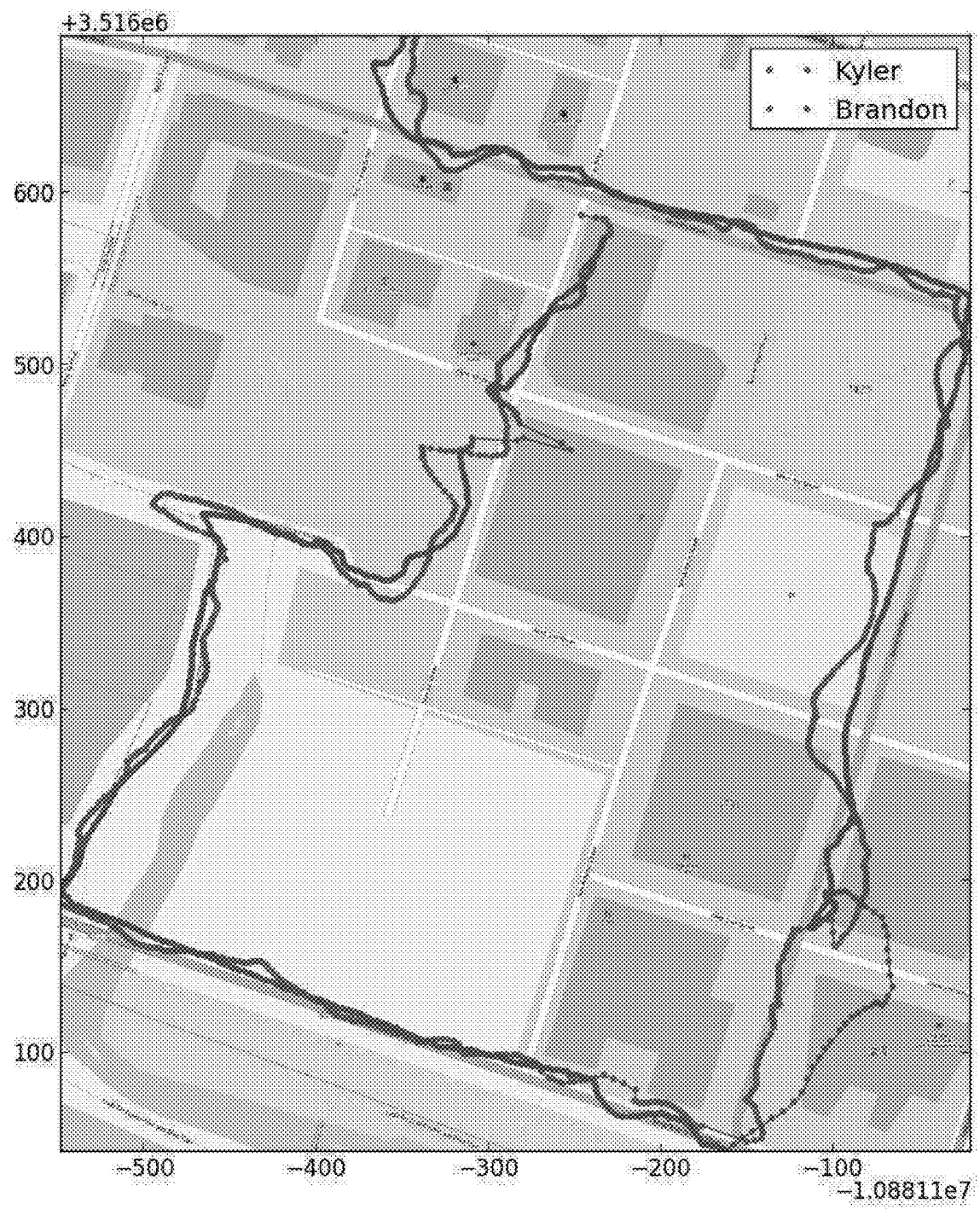
FIG. 10 is an exemplary map having map data relating to a particular calibration route according to the present disclosure.

FIG. 10 illustrates another example of map data for a particular calibration route according to the present disclosure. The illustrated embodiment indicates traversal by two different individuals. As shown, data points are collected as the individuals continue, data collection at each point may comprise route data such as latitude, longitude, altitude, etc.; alternatively, or in addition, the data may comprise user data such as acceleration/speed, number of steps since last data collection point, etc.

Figure 5A:
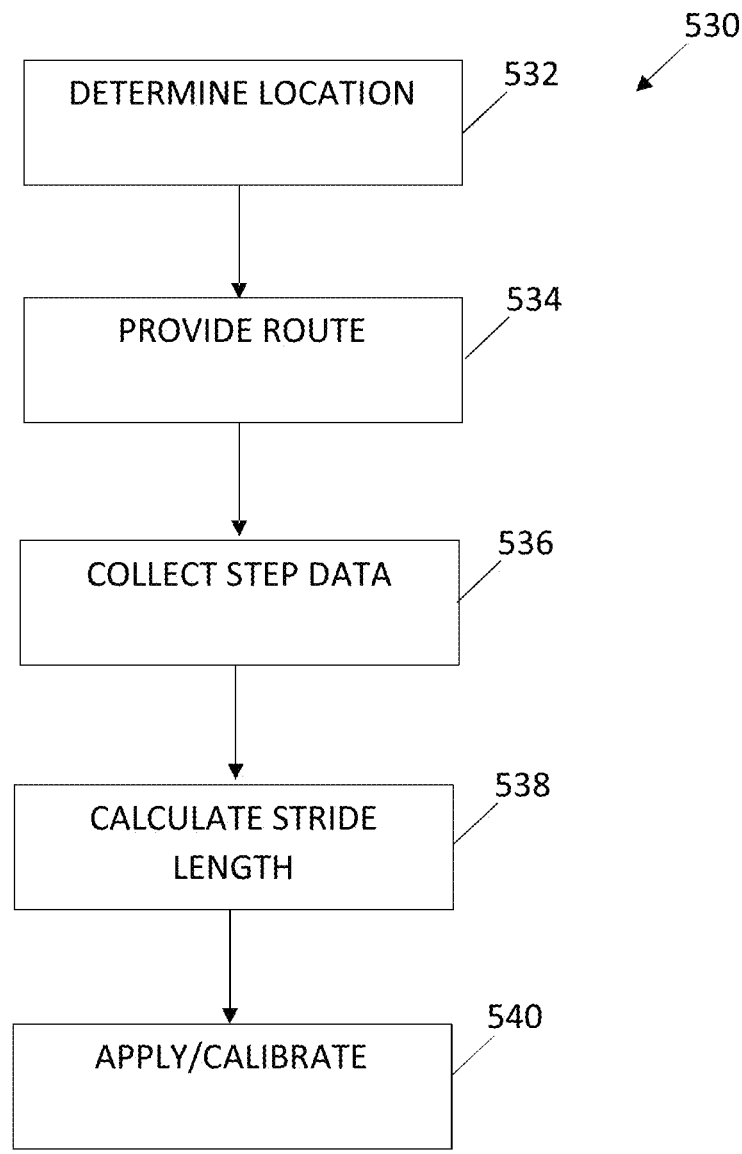
FIG. 5A is a logical flow diagram illustrating another exemplary method for calibrating the activity tracking system of FIG. 1.

Referring now to FIG. 5A another exemplary method 530 for calibrating the activity tracking system 100 is given. As shown, per step 532, a location of the user is determined. The user's location may be determined based on GPS data, manual entry of the location by the user, other geopositioning data, etc., as discussed above. Next, at step 534, a route is determined based on the user's current position. Similar to the embodiment discussed above, in one example, the route is determined from map data and comprises a start and/or end point which are within a given distance of the user's current location. The provided route is of a known distance (as determined by the map data) and is specifically identified as being of sufficient distance to enable calibration as discussed herein. As noted above, the user may be provided with several possible routes which he/she may traverse for calibration purposes.

The user is prompted to traverse the given route and as he/she does so, at step 536, step data is collected. In one embodiment, the step data is collected by the accelerometer 144 as raw data relating to movement of the user. The raw data is then converted to step data by e.g., the controller 156 and/or the processor 188. In one embodiment, the data collected by the accelerometer 144 is similar to the data of FIG. 3. The controller 156 and/or the processor 188 uses this data to determine a number of steps taken, i.e., step data, for example.

The step data is used at step 538 to calculate a stride length. In one embodiment, the stride length is determined by dividing the distance of the known route by the number of steps the user took to accomplish the known distance. For example, if one were to suppose that a particular user were given a route having a known length of 0.5 km, and the collected data indicates that the user took 66 steps to complete the route, then the system will derive that the user's stride length is 0.0076 km (i.e., 0.5 km/66 steps=0.0076 km/step). The determined stride length is stored in the memory of one or more of the measuring device 108 and/or the personal electronic device 104.

The calculated stride length is then applied to subsequently collected data to arrive at an accurate measure of distance traveled by the user (step 540). Hence, when the user goes on a run or a walk and the accelerometer collects data relating to a number of steps taken. In one example, 854 steps are counted; accordingly, the measuring device 108 and/or the personal electronic device 104 calibrates the collected data by applying the determined stride length (e.g., 0.0076 km/step). According to this embodiment, 854 steps multiplied by 0.0076 km/step equals 6.49 km traveled by the user.

Figure 5B:
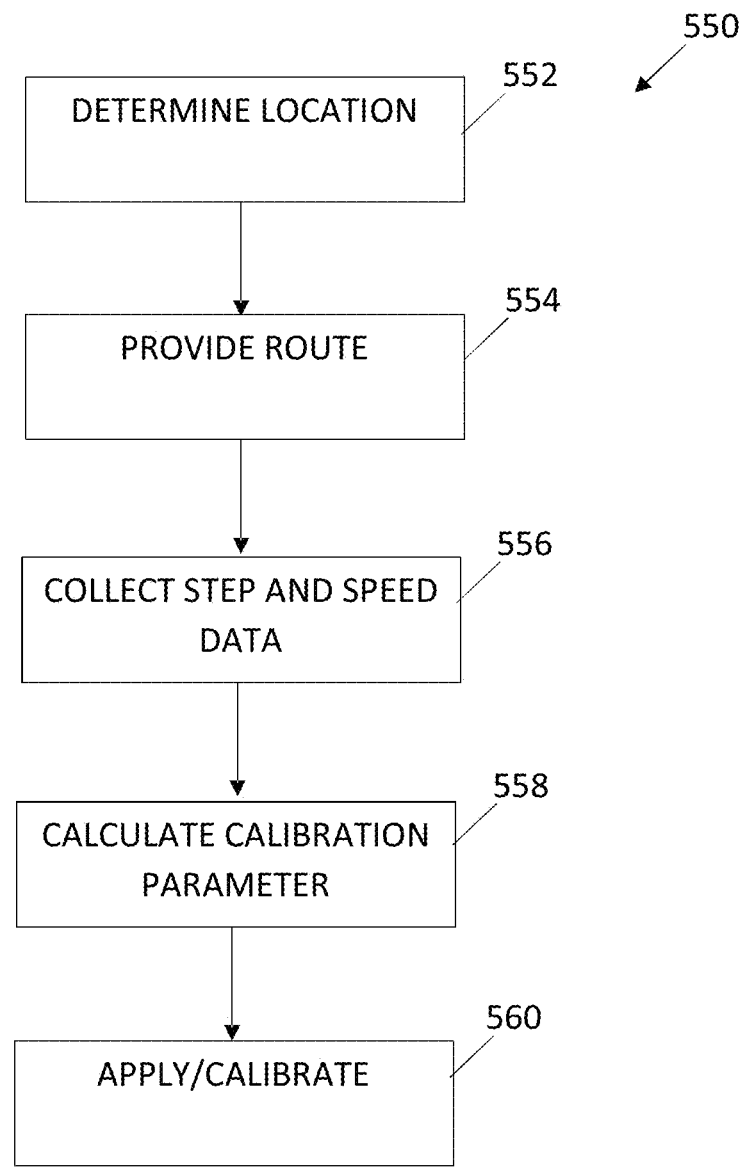
FIG. 5B is a logical flow diagram illustrating another exemplary method for calibrating the activity tracking system of FIG. 1.

Yet another exemplary method 550 for calibrating the activity tracking system 100 is given at FIG. 5B. Similar to the methods discussed above, a location of the user is determined, such as based on GPS data, manual entry, geopositioning data, etc. (step 552); and a route having a known distance is provided based on the user's current position, such as by using map data (step 554). Similar to the embodiments discussed above, in one example, the route comprises a start and/or end point which are within a given distance of the user's current location. The provided route is specifically identified as being of sufficient distance to enable calibration as discussed herein. As noted above, the user may be provided with several possible routes from which he/she may select one to traverse for calibration purposes.

As the user traverses the given route, at step 556 step and speed data are collected. The collected data may comprise accelerometer 144 data such as that described above. From the data the controller 156 and/or the processor 188 is able to derive step data and speed data including, e.g., an instantaneous and/or average step speed or rate, a number of steps taken, a time between steps, etc.

The step and speed data are used at step 558 to calculate a calibration parameter. In one embodiment, the calibration parameter is derived based on the average speed of the user across his/her traversal of the calibration route. For example, suppose that a user's average speed is 155 steps/min. The controller 156 and/or the processor 188 consults a mathematical equation which represents the relationship between the user's speed and stride length parameter. In one specific variant, the equation that is used to derive the curve of FIG. 3A, discussed above, is utilized. As shown in the graph of FIG. 3A, a user's stride speed of 155 (represented by the dashed line of FIG. 3A) corresponds to a stride length parameter (e.g., ratio of stride length to user's height) of roughly 0.8 stride length/height. The calibration parameter is saved in the memory of one or more of the measuring device 108 and/or the personal electronic device 104. In another alternative, rather than storing the calibration parameter, a stride length is stored (e.g., calibration parameter×user's height). Hence, for a user who is 160 cm tall, the stride length comprises 0.8*160=128 cm/step or 0.00128 km/step. It is further appreciated that in another embodiment, two different stride lengths or calibration parameters may be stored per user, a first which corresponds to the user's running stride length and the second which corresponds to the user's walking stride length.

The calculated stride length is then applied to subsequently collected data to arrive at an accurate measure of distance traveled by the user (step 560). Hence, when the user goes on a run or a walk and the accelerometer identifies a number of steps associated with the workout (for example, 854 steps). Next, the measuring device 108 and/or the personal electronic device 104 calibrates the collected step data by applying the determined calibration parameter (e.g., 0.8 stride length/height) or the calculated stride length (0.00128 km/step). In one example, assume the user is 160 cm (or 0.0016 km) tall. Accordingly, the distance traveled by the user in 854 steps comprises 854 steps*0.00128 km/step=1.09 km.

Figure 11:
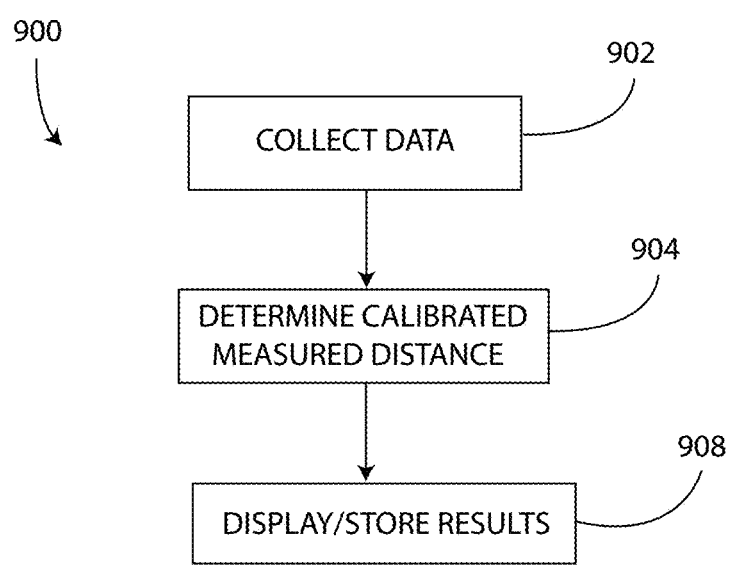
FIG. 11 is a logical flow diagram illustrating an exemplary method of processing data with the calibrated activity tracking system of FIG. 1.

As shown in FIG. 11, an exemplary method 900 of using the activity tracking device 100 after calibration includes collecting data, as shown in block 902. Collecting data includes using the accelerometer 144 to generate stride data 160 associated with a workout performed by the user of the activity tracking device 100 in which the user has traversed a certain distance. For instance, in this example, the "certain distance" traversed by the user is five kilometers (5 km). Next, as shown in block 904, the activity tracking system 100 determines the calibrated measured distance. In particular, the system 100 multiplies the number of periods 162 contained in the stride data 160 by the calibrated stride length to arrive at the calibrated measured distance. For example, the stride data 160 includes 4,167 periods and the calibrated stride length is 1.2 meters, such that when multiplied together the system 100 arrives at a calibrated measured distance of 5000.4 meters or 5 km. Thus, the activity tracking system 100 has applied the calibrated stride length (such as that determined during the calibration processes discussed in FIGS. 5-5B above) to the subsequently obtained stride data 160 to accurately determine the distance traversed by the user during the subsequent workout. Depending on the embodiment of the activity tracking system 100, the calibrated measured distance may be determined by only the personal electrical device 104, only the measuring device 108, or both the personal electronic device 104 and the measuring device 108.

Next, as shown in block 908 of FIG. 11, the activity tracking system 100 stores the calibrated measured distance in the memory 152, 184 and/or displays the calibrated measured distance on the display 168 of the personal electronic device 104 for evaluation by the user. In addition to displaying the calibrated measured distance, the activity tracking system 100 may also display the total time of the workout and time per kilometer traversed, along with data associated with the workout.

While the embodiments disclosed above involve a new route generated based on the user's location 220, in another embodiment of the activity tracking system 100, a plurality of pre-generated routes 224 are saved as the route data 134 in the memory unit 128 connected to the remote computer 124. In this embodiment, instead of generating a route near the current location 220, the remote computer 124 selects a pre-generated route 224 that is of suitable length and in a suitable location for the user. For example, the remote computer 124 selects a pre-generated route 224 having a starting point 228 and an ending point 232 located within the predetermined distance 236 of the current location 220. After selecting the pre-generated route 224, the route data 134, map data 132, and length data 200 associated with the pre-generated route 224 are sent to the personal electronic device 104. Similar logic applies where the pre-generated route(s) 224 are stored at the personal electronic device 104. The length data 200 is determined with the map data 132 and not by GPS data from the GPS satellite 112 according to this embodiment.

In yet another embodiment of the activity tracking system 100, the personal electronic device 104 generates the route 224 instead of the remote computer 124 generating the route 224. In this embodiment, the location data 192 is sent from the personal electronic device 104 to the remote computer 124. In response to receiving the location data 192, the remote computer 124 sends selected map data 132 to the personal electronic device 104 that corresponds to a map of the area surrounding the current location 220. The personal electronic device 104 stores the map data 132 in the memory 184 and then the controller 188 processes the map data 132 and the location data 192 to generate the route data 134 and the length data 200 without using GPS data from the GPS satellite 112 to determine the length of the route 224.

Figure 12:
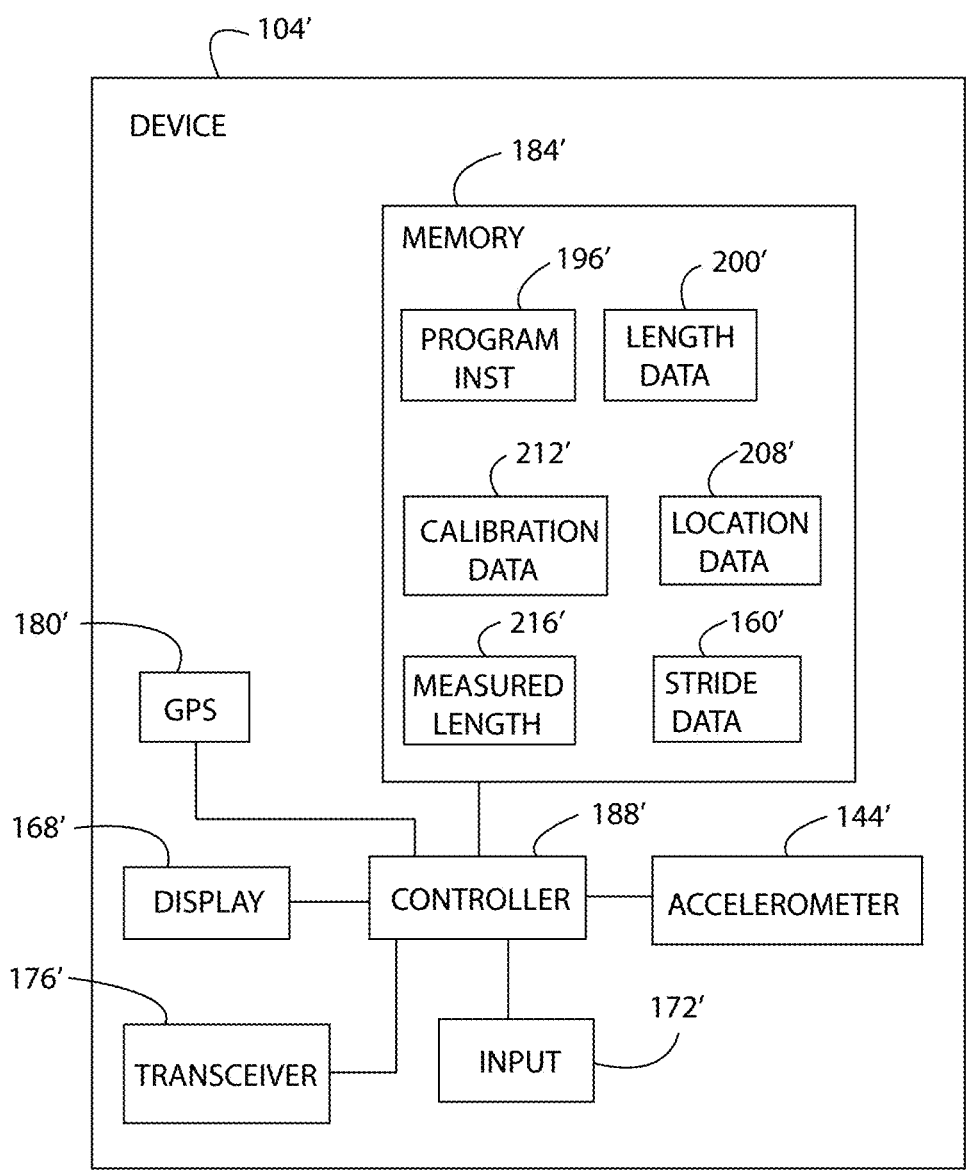
FIG. 12 is a block diagram illustrating another embodiment of the activity tracking system in which the components of a measuring device are included in a personal electronic device.

As shown in FIG. 12, in another embodiment of the activity tracking system 100, the components of the measuring device 108 are included in a personal electronic device 104'. Accordingly, FIG. 12 illustrates an embodiment in which the measuring device 108 is integral with the personal electronic device 104. The personal electronic device 104' may be provided as a smartphone, smart watch, or other similar type of electronic device. The personal electronic device includes a display unit 168', an input unit 172', a transceiver 176', a GPS receiver 180', an accelerometer 144', and a memory 184' each of which is electrically connected to a controller 188'. The memory 184' is configured to store program instruction data 196', length data 200', location data 192', calibration data 212', measured length data 216', and stride data 160'. The personal electronic device 104' is configured to calibrate the accelerometer 144' according to any of the embodiments of the calibration process 500 (such as those of FIGS. 5-5B) without using GPS data from the GPS satellite 112 to determine the length of the route 224.

In another embodiment, individual instances of the foregoing applications or processes may be a launched by the devices 104 or 108 via a generic browser, such as Internet Explorer, available from Microsoft Corp., of Redmond, Wash., or Safari from Apple Computer of Cupertino, Calif. In yet another embodiment, a permanent copy of the programming instructions for individual instances of the aforementioned applications or processes may be placed into permanent storage devices (such as e.g., the memory 184, 152, and/or 184') during manufacture thereof, or in the field, through e.g., a distribution medium (not shown), such as a compact disc (CD), or through communication interface (from a distribution server (not shown)). That is, one or more distribution media having an implementation of the agent program may be employed to distribute the agent and program various computing devices.

In sum, a method of calibrating data collected by a monitoring device to one or more physiological parameters of a user is disclosed. In one embodiment, the method comprises: determining a current location of the user; providing at least one calibration route to the user via a display, the calibration route having a known length; receiving step data from the monitoring device as the user traverses the calibration route; and calculating a calibration parameter representative of at least one physiological parameter of the user based at least in part on the known length and the received step data.

A non-transient computer readable medium containing computer executable instructions is also disclosed. In one embodiment, the computer executable instructions are configured to, when executed by a processor: determine a current position of a user; consult map data to identify a route having a starting and/or ending position within a predefined proximity to the current position of the user, the route having a known length; receive data collected by an accelerometer as the user traverses the route; and calculate a calibration factor representative of at least one physiological parameter of the user based at least in part on the known length and the received step data.

A personal electronic device configured to enable calibration of data relating to a distance traveled by a user is also disclosed. In one embodiment, the personal electronic device comprises: a transceiver apparatus configured to receive step data from an device comprising at least an accelerometer; at least one storage apparatus; and a processor configured to execute at least one computer application thereon, the computer application comprising a plurality of instructions which are configured to, when executed by the processor cause the device to: determine a current position of a user using Global Positioning System data; consult map data to identify a route having a starting and/or ending position within a predefined proximity to the current position of the user, the route having a known length; receive data collected by the accelerometer as the user traverses the route; and calculate a calibration factor representative of at least one physiological parameter of the user based at least in part on the known length and the received step data.

The herein described applications or processes improve the functioning of the personal electronic device 104 and/or the measuring device 108, respectively or in combination by enabling it/them to provide calibrated measurements. Furthermore, devices that are able to provide calibrated measurements (such as distance as discussed herein) can operate to more efficiently and conveniently provide highly accurate measurements to a user and thereby improve accuracy of the user's progress toward personal fitness goals.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

It will be appreciated that the various ones of the foregoing aspects of the present disclosure, or any parts or functions thereof, may be implemented using hardware, software, firmware, tangible, and non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method of calibrating data collected by a monitoring device to one or more physiological parameters of a user, said method comprising:

determining a current location of the user using Global Positioning System (GPS) data received by a GPS receiver;

after determining the current location of the user, identifying at least one calibration route from a plurality of predetermined routes stored in a remote computer, wherein identifying the at least one calibration route comprises utilizing map data to identify at least one route having (i) a predetermined length and (ii) a starting position and an ending position both within a predefined proximity to the current location of the user, wherein the map data does not include GPS data, and wherein the predetermined length is an altitude-adjusted length based on at least one straight-line length for the at least one route and an altitude change for the at least one route from the map data;

after identifying the at least one calibration route, providing the at least one calibration route to the user via a display;

receiving a selection of the at least one calibration route from the user;

receiving step data from the monitoring device as the user traverses the calibration route;

calculating a calibration parameter representative of at least one physiological parameter of the user based at least in part on the known length and the received step data;

storing the calibration parameter for subsequent use; and when subsequently collected step data is received from the monitoring device, applying the calibration parameter thereto in order to determine at a distance traveled by the user based on the subsequently collected step data.

2. The method of claim 1, wherein the step data comprises a number of steps and the act of calculating the calibration parameter comprises dividing the known length by the number of steps.

3. The method of claim 1, wherein the step data comprises a step rate and the act of calculating the calibration parameter comprises:
determining an average step speed of the user during the calibration route; and
entering the average speed and a height of the user into a mathematical formula configured to determine the user's stride length therefrom.

4. The method of claim 1, wherein the monitoring device comprises an accelerometer.

5. A non-transitory computer readable medium containing computer executable instructions which are configured to, when executed by a processor:
determine a current position of a user using Global Positioning System (GPS) data received from a GPS receiver;
after determining the current position of the user, consult map data to identify a route from a plurality of predetermined routes stored in a computer memory, the route having a starting and ending position within a predefined proximity to the current position of the user, the route having a known length within a predetermined range and a starting and ending position both within a predefined proximity to the current position of the user, wherein the map data is accessed from a remote computer and comprises geo-data that does not include GPS data, the geo-data including at least one straight-line length and an altitude change, and wherein the known length is derived based on the at least one straight-line length and the altitude change;
after identifying the route, providing the route to the user via a display;
receive a selection of the route from the user;
receive data collected by an accelerometer as the user traverses the route;
calculate a calibration factor representative of at least one physiological parameter of the user based at least in part on the known length and the received step data;
store the calibration parameter for subsequent use; and
when subsequently collected step data is received from a monitoring device, apply the calibration parameter thereto in order to determine a distance traveled by the user based on the subsequently collected step data.

6. The computer readable medium of claim 5,
wherein the data collected with the accelerometer as the user traverses the route comprises a number of steps;
wherein the estimated at least one physiological parameter of the user comprises a stride length of the user; and
wherein calculation of the calibration factor comprises determining a ratio of:
(i) the known length of the route, and
(ii) the difference between the known length of the route and the length of the route determined by multiplication of the number of steps and the stride length.

7. The computer readable medium of claim 5,
wherein the data collected by the accelerometer as the user traverses the route comprises a number of steps;

wherein the estimated at least one physiological parameter of the user comprises a stride length of the user; and
wherein calculation of the calibration factor comprises dividing the known length of the route by the number of steps.

8. The computer readable medium of claim 5,
wherein the data collected by the accelerometer as the user traverses the route comprises a rate at which the user steps;
wherein the estimated at least one physiological parameter of the user comprises a stride length of the user; and
wherein calculation of the calibration factor comprises determining an average step speed of the user during the calibration route and entering the average speed and a height of the user into a mathematical formula configured to determine the user's stride length therefrom.

9. A personal electronic device configured to enable calibration of data relating to a distance traveled by a user, the device comprising:
a transceiver apparatus configured to receive step data from a device comprising at least an accelerometer and configured to receive geo-data from a remote computer;
a Global Positioning System (GPS) receiver configured to receive GPS data;
at least one storage apparatus;
a display screen; and
a processor configured to execute at least one computer application thereon, the computer application comprising a plurality of instructions which are configured to, when executed by the processor cause the device to:
determine a current position of a user using GPS data received at the GPS receiver;
after determining the current position of the user, consult map data to identify a route from a plurality of predetermined routes stored in a computer memory, the route having a starting and ending position both within a predefined proximity to the current position of the user, the route having a known length, wherein the map data comprises geo-data accessed from the remote computer, and wherein the geo-data does not include GPS data;
display the route on the display screen;
receive a selection of the route from the user;
receive data collected by the accelerometer as the user traverses the route;
calculate a calibration factor representative of at least one physiological parameter of the user based at least in part on the known length and the received step data;
store the calibration factor for subsequent use; and
when subsequently collected step data is received from the device comprising at least an accelerometer, apply the calibration parameter thereto in order to determine a distance traveled by the user based on the subsequently collected step data.

10. The personal electronic device of claim 9, wherein:
the data received from the accelerometer comprises a number of steps associated to a user's traversal of a first known route; and
the at least one physiological parameter comprises a stride length.

11. The personal electronic device of claim 10, wherein the plurality of instructions are configured to, when executed by the processor cause the device to:

multiply of the number of steps taken during traversal of the first known route by an estimated stride length of the user to arrive at a user-specific distance; and determine a ratio of:
(i) the known distance of the first known route, and
(ii) the difference between the known distance and the user-specific distance of the route.

12. The personal electronic device of claim 9, wherein:

the data received from the accelerometer comprises a rate at which the user steps; and the at least one physiological parameter comprises a stride length.

13. The personal electronic device of claim 12, wherein the plurality of instructions are configured to, when executed by the processor cause the device to:

determine an average step speed of the user during the calibration route; and enter the average speed and a height of the user into a mathematical formula configured to determine the user's stride length therefrom.

14. The method of claim 1 wherein the monitoring device is a personal electronic device carried by the user as the user traverses the calibration route, the personal electronic device including the GPS receiver.

* * * * *